US011549022B2

(12) United States Patent
Dustin et al.

(10) Patent No.: US 11,549,022 B2
(45) Date of Patent: Jan. 10, 2023

(54) CONDUCTIVE COMPOSITES

(71) Applicant: The Boeing Company, Chicago, IL (US)

(72) Inventors: Ashley M. Dustin, Los Angeles, CA (US); Andrew P. Nowak, Los Angeles, CA (US); Xin N. Guan, Monterey Park, CA (US); Adam F. Gross, Santa Monica, CA (US); Richard E. Sharp, Weldon Spring, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/539,243

(22) Filed: Aug. 13, 2019

(65) Prior Publication Data
US 2021/0047523 A1 Feb. 18, 2021

(51) Int. Cl.
*C09D 5/24* (2006.01)
*C09D 7/61* (2018.01)
*C09D 7/63* (2018.01)
*C09D 7/44* (2018.01)
*H01B 1/22* (2006.01)
*H01B 5/14* (2006.01)
*C08K 3/08* (2006.01)

(52) U.S. Cl.
CPC ............ *C09D 5/24* (2013.01); *C08K 3/08* (2013.01); *C09D 7/44* (2018.01); *C09D 7/61* (2018.01); *C09D 7/63* (2018.01); *H01B 1/22* (2013.01); *H01B 5/14* (2013.01); *C08K 2201/001* (2013.01)

(58) Field of Classification Search
None
See application file for complete search history.

(56) References Cited

U.S. PATENT DOCUMENTS

| | | | | |
|---|---|---|---|---|
| 7,947,773 B2* | 5/2011 | Hansen | ............... | B29C 70/882 524/434 |
| 2007/0246245 A1* | 10/2007 | Ahn | ............... | H01B 1/20 174/126.2 |
| 2008/0152835 A1* | 6/2008 | Mayers | ............... | B82Y 40/00 427/532 |
| 2009/0155532 A1* | 6/2009 | Gammon | ............... | C08K 7/06 428/147 |
| 2011/0039064 A1* | 2/2011 | Wani | ............... | D06M 23/08 428/137 |
| 2016/0059195 A1* | 3/2016 | Lai | ............... | C08K 3/34 524/35 |
| 2017/0218167 A1* | 8/2017 | Majidi | ............... | C08K 3/08 |

FOREIGN PATENT DOCUMENTS

| | | |
|---|---|---|
| CN | 107 452 436 A | 12/2017 |
| CN | 108 447 592 A | 8/2018 |
| CN | 108 986 949 A | 12/2018 |
| EP | 3 502 155 A1 | 6/2019 |
| JP | 2002067232 A * | 3/2002 |
| WO | WO 2019/136252 A1 | 7/2019 |

OTHER PUBLICATIONS

English machine translation of Hayashi et al. (JP 2002-067232 A) accessed online from Espacenet; PDF pp. 1-6 attached to the case file. (Year: 2002).*
Mrozek R A, et al., "Highly conductive melt processable polymer composites based on nickel and low melting eutectic metal", Polymer, Elsevier Sciences Publisher, vol. 51, No. 14, Jun. 2010, pp. 2954-2958.
Yan Jiajun et al., "Solution processable liquid metal nanodroplets by surface-initiated atom transfer radical polymerization", Nature Nanotechnology, vol. 14, No. 7, May 2019, pp. 684-690.
Extended European Search Report prepared by the European Patent Office in application No. EP 20 19 0780.5 dated Jan. 28, 2021.

* cited by examiner

*Primary Examiner* — Katie L. Hammer
(74) *Attorney, Agent, or Firm* — McDonnell Boehnen Hulbert & Berghoff LLP

(57) ABSTRACT

Disclosed are conductive composites comprising a polymer, a conductor selected from metals and metal alloys, a compatibilizing agent, and an optional thickening agent.

37 Claims, 3 Drawing Sheets

CONDUCTIVE COMPOSITES

FIELD

This disclosure relates to conductive composite materials, more specifically to conductive polymer composites, and to methods and compositions useful for preparing such materials.

BACKGROUND

A conductive composite, broadly defined, is any composite having significant electrical or thermal conductivity. Such composites contain an electrically conducting phase dispersed in a polymeric resin. The unique properties of such composites make them technologically superior to or more cost effective than alternative materials in a variety of applications. As a result, conductive composites have a broad range of uses in areas such as telecommunications, power generation and distribution, defense, aerospace, medicine.

In the context of using conductive composites, conductivity is not only significant, but is typically a primary characteristic of the composite. The conductivity of the materials varies by use. For certain applications, composites that have an effective sheet resistance of less than 100 Ohm/sq are important.

Conductive composites are commonly manufactured by and/or properties are achieved by incorporating a polymeric material with solid conductive particles. To achieve sufficient conductivity, i.e., to reach percolation, high particle loadings, typically in excess of 45 volume %, are often needed. The polymers used with these particle loading levels are normally rigid materials. As a consequence, these particle loading levels result in conductive films and coatings that have properties such as elongation at break, tensile strength, and thermal stability that make them inappropriate or difficult to use. Solutions to this problem that employ liquid metal suffer from leakage of the metal from the polymer matrix.

There also exists a need for conductive polymer coatings and films having a wide operating temperature range.

Therefore, there is a need for composites that are conductive, avoid leakage of the metal from the polymer, and have characteristics that permit a wide variety of uses under different environmental conditions, i.e., elongation, tensile strength, and thermal stability.

SUMMARY

This disclosure provides a convenient solution to the problems identified above. In a broad aspect, this disclosure provides a conductive composite comprising a polymer, a low melting conductor, i.e., a conductor selected from metals and metal alloys having a melting temperature below about 60° C.; and a compatibilizing agent. The low melting conductor and the compatibilizing agent typically are in the form of a paste.

The paste provides (1) conductivity without rigidity and (2) increased viscosity and improved flow properties to prevent leakage of low melting conductor from the composite.

This disclosure provides composite materials that are conductive and can be elastomeric. Obtaining both of these properties in a single composite material is difficult and often unattainable when employing common methods of introducing conductivity.

Composites that are elastomeric and conductive are particularly useful in applications where unwanted electromagnetic interference is to be reduced or eliminated.

In another aspect, this disclosure provides a conductive composite comprising a polymer, a low melting conductor; a compatibilizing agent; and an optional thickening agent.

The conductive composites of this disclosure are capable of carrying a high metallic content and still exhibit excellent elasticity.

The conductive composites are also capable of providing high levels of electrical conductivity using low amounts of the low melting conductor.

In another aspect, the conductive composites of this disclosure are in the form of a laminate. A laminate conductive composite contains a continuous layer of a conductive composition, typically a paste, comprising a low melting conductor and a compatibilizing agent.

In another aspect, the conductive composites comprise an electrically conductive network stably and homogeneously and/or continuously entrapped within the polymer matrix. The network comprises a low melting conductor and a compatibilizing agent. In this aspect, the conductor is uniformly or homogeneously distributed throughout the polymer matrix.

In another aspect, this disclosure provides a composition, typically in the form of a paste, comprising a metal or metal alloy having a melting temperature below about 60° C. and a compatibilizing agent.

Still another aspect of this disclosure provides a conductive composite comprising an elastomer, a conductor selected from metals and metal alloys having a melting temperature below about 60° C., and a compatibilizing agent, wherein the conductive composite has or exhibits a maximum bulk conductivity of about $5 \times 10^5$ S/m at 20° C., an elongation greater than or equal to 50%, and a tensile strength greater than or equal to 3 MPa.

In addition, this disclosure provides conductive composites comprising an elastomer, a conductor selected from metals and metal alloys having a melting temperature below about 60° C., and a compatibilizing agent.

This disclosure also provides substrates carrying a layer of a conductive composite, wherein the conductive composite comprises a polymer, a conductor selected from metals and metal alloys having a melting temperature below about 60° C., and a compatibilizing agent.

This disclosure further provides methods for preparing a substrate carrying a layer of a conductive composite, the methods comprising heating a conductive composite as disclosed herein and applying it to a substrate.

In another aspect, this disclosure provides methods for shielding an electrical component from electromagnetic radiation or interference, the methods comprising providing a conductive composite of this disclosure between a source of electromagnetic radiation and the electrical component.

The conductive composites disclosed herein can be rigid or flexible. In certain examples, the conductive composite is elastomeric, i.e., an elastomer.

The conductive composites of this disclosure can be made by combining a liquid metal, e.g., a gallium alloy, typically in the form of a paste, with a polymer or prepolymer, and if necessary curing the prepolymer or polymer.

The conductive composites can also be made by a process which comprises combining a mixture of monomers or a polymer composition with composition comprising a conductor selected from metals and metal alloys having a melting temperature below about 60° C. and a compatibilizing agent. This process can optionally further include allowing the mixture to cure to form the conductive composite.

In another aspect, the conductive composites of this disclosure can be made by layering a conductive paste onto the surface of a first cured or partially cured polymer, wherein the conductive paste comprises (a) a conductor selected from metals and metal alloys having a melting temperature below about 60° C. and; and (b) a compatibilizing agent.

In still another aspect, the conductive composites of this disclosure can be made by spreading a conductive paste onto a non-stick surface, applying uncured polymer over the paste, and then curing the polymer. The composite can then be conveniently removed from the non-stick surface by peeling the composite from the non-stick surface. After removal from the non-stick surface, and if necessary or desirable, an additional layer of cured or uncured polymer may be added over the conductive paste and cured if necessary to produce a sandwich or laminate structure.

In the composites disclosed herein, the paste has the following functions: providing conductivity without unnecessary rigidity; and increased the viscosity and flow properties of the conductor to prevent leakage thereof when the composite is being manufactured or used.

This disclosure also provides liquid metallic pastes, typically pastes comprising a gallium alloy and a compatibilizing agent, which exhibit a loss modulus greater than the storage modulus, i.e., have a tan delta greater than 1.

DETAILED DESCRIPTION

Figure 1:
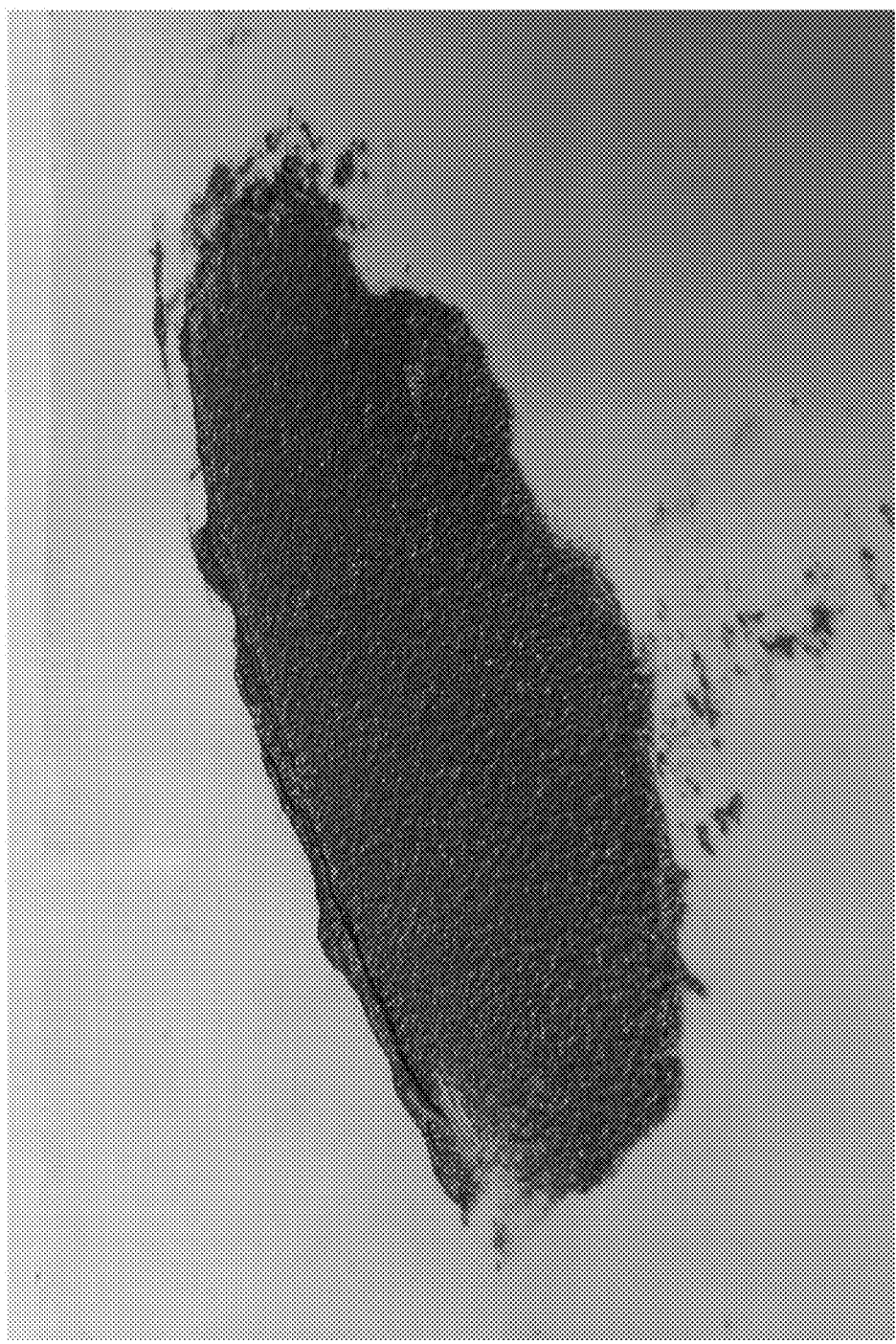
FIG. 1 is a photograph of a paste made according to Example 2 spread on a release film. The paste is made using a gallium alloy containing 61.0% Ga, 25.0% In, 13.0% Sn, and 1.0% Zn by weight, Polyethylene glycol p-(1,1,3,3-tetramethylbutyl)-phenyl ether (Triton™ X100), stainless steel powder (as a thickener), and stainless steel wire (as a thickener).
Figure 2:
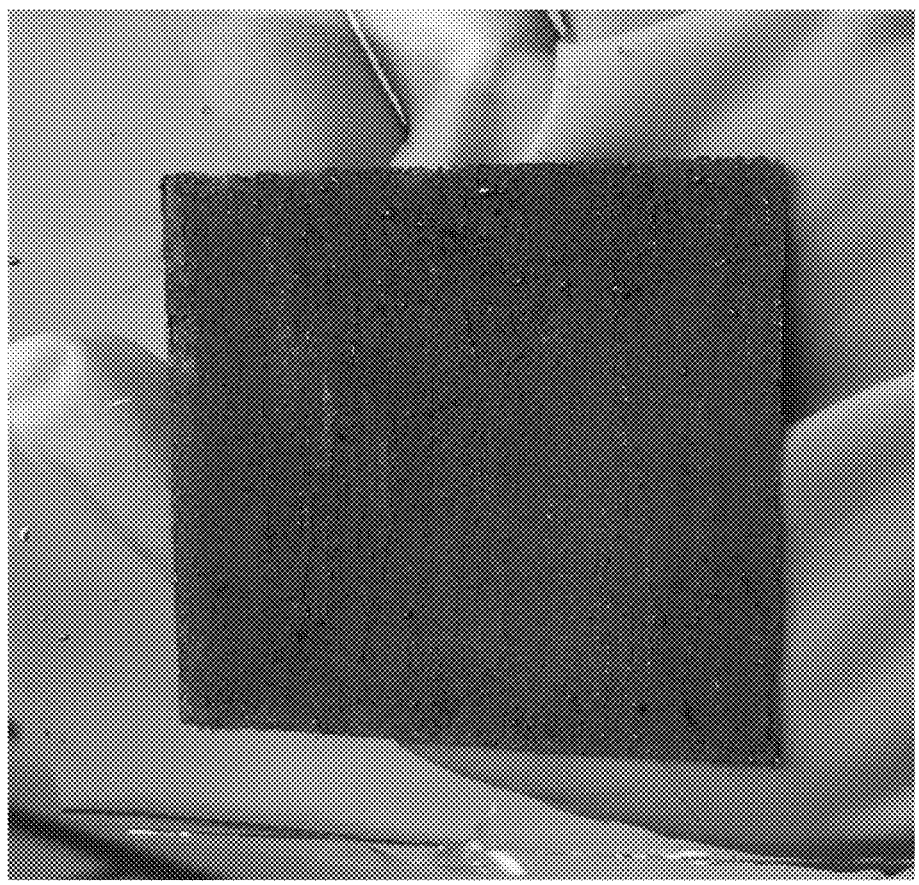
FIG. 2 is a photograph of the laminate composite of Example 2. The conductive composite is a laminate containing a layer of the paste between layers of Polydimethylsiloxane (Sylgard™ 184).

As used herein, the term "low-melting conductor" refers to a conductor selected from metals and metal alloys and mixtures thereof having a melting temperature below about 60° C.

As used herein, the terms "conductive" means capable of conducting electricity or transmitting an electrical current. The term "conductivity" refers to the level at which a specified material conducts electricity. A "conductor" as used herein means a material that is conductive, i.e., conducts electricity.

By 'does not substantially leak' as used herein is meant that less than about 10% of the conductor by volume leaks from the composite at 50% elongation.

By "electrically conductive network" as used herein is meant an interconnected system that is capable of transferring electrons, i.e., creating an electrical current, between different regions of the composite.

As used herein, the term "flexible" refers to materials that are not rigid, i.e., materials that bend rather than break, and more particularly to materials having a Young's modulus (E) of less than about 10 gigapascals (GPa). In certain examples, "flexible" as used herein means a Young's modulus of less than about 2 GPa. In other examples, "flexible" as used herein means a Young's modulus of less than about 1 GPa.

The terms "conductive mixture", "paste" and "paste layer" are used interchangeably herein.

Thus, the term "stably and homogeneously entrapped within the polymer" as used herein means that the conductor and the compatibilizing agent, and any optional thickening agent, are permanently held within the polymer matrix and do not migrate within the composite or leak when the composite is used. In this context, the composite is a substantially uniform blend or mixture of the polymer, compatibilizing agent, and any optional thickening agent. The conductivity of the composite does not diminish over extended periods of time.

Thus, the term "stably and homogeneously entrapped between layers of polymer" as used herein means that the conductor and the compatibilizing agent, and any optional thickening agent are permanently held as a layer in a laminate conductive composite between layers of polymer and do not migrate within the composite or leak when the composite is used. The conductivity of the laminate composite does not diminish over extended periods of time.

As noted above, this disclosure provides a solution to the problems encountered previously in making conductive composites. The conductive composites disclosed herein comprise a polymer, a low melting conductor, and a compatibilizer. These conductive composites can be made to be flexible or rigid, depending on the desired use. Importantly, the conductor does not leak or does not substantially leak from the composite when the composite is flexed or otherwise manipulated.

The conductive composites herein can be in the form of a laminate or a blend of the materials. In the laminates, the low melting conductor and the compatibilizing agent are a mixture, typically in the form of a paste, supported on a layer of polymer or between layers of polymer. The polymer of each layer may be a single polymer material or a mixture of materials. As used herein, the term "conductive mixture layer" refers to the layer of a laminate that comprises the low melting conductor and the compatibilizing agent.

The thickness of each layer, i.e., the polymer layers and the conductive laminate layer(s), of the laminates can be adjusted as necessary to achieve the characteristics desired of the final composite. Laminate composites herein can include multiple polymer and multiple conductive layers. For example, a laminate can contain a total of five layers, where each of three polymer layers sandwich a conductive mixture, i.e., the polymer layers are separated by the conductive mixture layers (paste layers) except at the edges of the composite where the polymer layers are in contact with one another. In an example of a composite which is a three-layer laminate, i.e., a conductive mixture layer is sandwiched between two polymer layers, the total thickness of the laminate can be 5 mm, with each polymer layer having a thickness of about 1 mm. The conductive mixture layer of such a composition has a thickness of about 3 mm. In another example, of a three-layer laminate, the polymer layers may each be about 2 mm in thickness, and the conductive mixture layer is about 1 mm in thickness. Where weight savings are important, the composite will contain fewer layers and each layer will be as thin as possible while providing a desired level of conductivity.

Forming the conductive composites as laminates in which the conductive composition is a continuous layer allows for the use of lower amounts of the low melting conductor and the compatibilizing agent to obtain a desired level of conductivity.

When used to provide shielding, conductive composites of this disclosure that are manufactured as laminates are preferred for use with flat components and with components with one axis of curvature, such as, for example, a cylinder. Although laminates can be used to shield components with complex surface geometries, they are less in such situations because laminates tend to buckle when applied to or wrapped around complex surfaces.

In other examples, the conductive composite is a blend or mixture comprising the conductor and compatibilizing agent are substantially uniformly distributed throughout a polymer. Manufacture of such composites can be accomplished by combining a mixture of monomers or a polymer composition with a low melting conductor and a compatibilizing agent, and optionally curing the polymer or polymerizing the monomer mixture. In such conductive composites, the low melting conductor and the compatibilizing agent are substantially uniformly dispersed throughout the polymer.

The conductive composites disclosed herein that are in the form of a blend or mixture comprise an electrically conductive network stably and homogeneously and/or continuously entrapped within a polymer. The network comprising a low melting conductor, i.e., a conductor having a melting point below about 60° C., and a compatibilizing agent. The compatibilizing agent is a compound or metal that does not alloy with the conductor when in the composite or during its manufacture.

Further, without wishing to be bound by theory, in the composites that are a blend of the low melting conductor and polymer (i.e., other than a laminate), it is believed that the metal and the compatibilizing agent form the electrically conductive network within pores (free volume) created in the polymer during the curing process. In addition, again without wishing to be bound by theory, it is believed that the pore structure of the polymer can be considered to be open, which permits the resulting connectivity between different regions of the composite. The compatibilizing agent cooperates with the low melting conductor and any optional thickening agent, to retain the conductor within the pores. The combination of the compatibilizing agent and the conductor can be considered a paste. As discussed below, the paste behaves more like a liquid than a solid, permitting the composite to be flexible and, e.g., to bend. Use of a conductor having a melting temperature below about 60° C. permits the formation of the paste and the formation of the electrically conductive network.

Conductive composites of this disclosure that are manufactured as blends of the polymer, low melting conductor, compatibilizing agent, and optional thickener can be used as, for example, conductive seals and coatings for a variety of surfaces and materials.

Conductive composites of this disclosure that are manufactured as blends of the polymer, low melting conductor, compatibilizing agent and optional thickener are particularly suitable for use as shielding on components that have complex surface geometries. Such composites are capable of conforming to complex surface shapes without buckling.

In certain examples, the conductive composites of this disclosure can be manufactured to include redundant conductive paths. By "redundant conductive path" is meant an electrical path that has electrical connections in three dimensions. As noted elsewhere herein, the conductive composites of this disclosure that are manufactured as blends of the polymer, low melting conductor, compatibilizing agent and optional thickener contain a network of the low melting conductor and the compatibilizing agent stably and homogeneously and/or continuously entrapped within the polymer matrix. As a result, the conductor is uniformly or homogeneously distributed in three dimensions throughout the polymer matrix, thus producing redundant conductive paths. Bending or creasing the blend conductive composites will typically not result in a loss of conductivity across the bend or crease because another electrical path will remain around the compression point created by the bend or crease.

As noted above, this disclosure provides a conductive composite comprising a polymer, a low melting conductor and a compatibilizing agent. The low melting conductor and the compatibilizing agent typically are in the form of a paste, i.e., a viscous mixture of the components.

The polymer can be a rigid polymer or the polymer can be an elastomer (elastomeric polymer). The elastomeric polymers herein can be thermoset elastomers or thermoplastic elastomers. Whether the polymer chosen for manufacturing the conductive composite is rigid or elastomeric will typically depend on the end use or the manner in which the composite is to be applied to a substrate. For example, where the ultimate use requires flexibility, the polymer will be an elastomer so that the conductive composite. In such situations, the composite may be referred to as a flexible conductive composite. Thermoplastic elastomers will be useful for the mode of manufacture involves molding or shaping the conductive composite to a desired configuration or while applying it to a substrate.

Thermoset elastomers useful for making the conductive composites disclosed herein include: acrylic resins, polyesters and vinyl esters, phenolic resins, amine-functional resins, polyamides including nylons, polylactic acids, polystyrenes, acrylonitrile butadiene styrenes, polybenzimidazoles, polycarbonates, polyether sulfones, polyaryletherketones, polyetherimides, polyurethanes, polyurea/polyurethane hybrids, polyimides, polysulfides, furan resins, copolymers thereof, and mixtures thereof.

The thermoset elastomers can also be made from epoxy functional resins, which can be homo-polymerized with anionic or cationic catalysts and heat, or copolymerized through nucleophilic addition reactions with multifunctional crosslinking agents which are also known as curing agents or hardeners.

In certain examples, the conductive composite will optionally be flexible and will be formed from a thermoplastic polymer, e.g., a thermoplastic elastomer. Thermoplastic elastomers useful in the conductive composites disclosed herein include, for example, polyamides including nylons, polylactic acids, polystyrenes, acrylonitrile butadiene styrenes, polybenzimidazoles, polycarbonates, polyether sulfones, polyoxymethylenes, polyaryletherketones, polyetherimides, polyethylenes, polypropylenes, polyphenylene oxides, polyphenylene sulfides, polyvinyl chlorides, polyesters, polyvinylidene fluorides, silicones including polysiloxanes and polyfluorosiloxanes, perfluoropolyethers, polybutadienes, polyacrylates, polyurethanes, polyurea/polyurethane hybrids, thermoplastic vulcanizates, polytetrafluoroethylenes (Teflon®), polyepoxides, polyimides, cyanate esters, polycyanurates, polysulfides, and copolymers and mixtures thereof.

Suitable thermoplastic elastomers for use in making the conductive composites disclosed herein have viscosities of about 1000 to about 100,000 cP, or from about 1000 to about 25,000 cP, or from about 25,000 to about 50,000 cP, or from about 50,000 to about 75,000 cP, or from about 75,000 to about 100,000 cP under typical processing conditions. In certain examples, suitable thermoplastic elastomers for use herein have viscosities of from about 1000 to about 50,000 cP under typical processing conditions. As used herein, the term "typical processing conditions" includes temperatures of from about room temperature (about 25° C.) to about 200° C., or from about room temperature to about 100° C. Such thermoplastic elastomers are convenient for making flexible materials.

The compositions and methods disclosed herein employ a low melting conductor. Suitable low melting conductors are metals and metal alloys having a melting temperature below about 60° C. In certain examples, the low melting conductor has a melting point below about 50° C., or below about 40° C., or below about 30° C., or below about 25° C., or below about 20° C. In certain examples, the melting point is sufficiently low for the alloy to be liquid when first combined with the compatibilizing agent and to form a spreadable paste when thoroughly mixed with the compatibilizing agent.

In certain examples, the low melting conductor is an alloy comprising at least about 50% by weight of gallium, bismuth, mercury, or combinations thereof. Suitable gallium alloys also include indium, tin, bismuth, phosphorus, lead, zinc, cadmium, antimony, or combinations thereof. Indium, tin, bismuth, phosphorus, lead, zinc, cadmium, antimony, or combinations thereof can be included to modify the melting temperature of the alloy as desired.

The low melting conductor can include a minor amount of impurities, i.e., an amount that does not substantially change the rheological characteristics of the paste or the conductive and mechanical characteristics of the final conductive composite.

In an example the low melting conductor used in the conductive composites disclosed herein is an alloy comprising indium and 50-97% by weight of gallium.

In another example, the low melting conductor used to form the conductive composites disclosed herein is an alloy comprising about 15-30% by weight of indium, about 55-80% by weight of gallium, and at least one metal selected from tin and zinc. Suitable gallium alloys are commercially available from Indium Corporation.

Representative gallium alloys for use in the disclosed compositions include alloys with the following compositions and characteristics:

| Composition (weight %) | Liquidus (° C.) | Solidus (° C.) |
| --- | --- | --- |
| 61.0Ga/25.0In/13.0Sn/1.0Zn | 7.6 | 6.5 |
| 66.5Ga/20.5In/13.0Sn | 10.7 | 10.7 |
| 62.5Ga/21.5In/16.0Sn | 16.3 | 10.7 |
| 75.5Ga/24.5In | 15.7 | 15.7 |
| 95Ga/5In | 25.0 | 15.7 |

The low melting conductor can be selected to achieve appropriate characteristics of the paste composition used to make the composite. A paste composition is preferably homogenous and made using the low melting conductor and compatibilizing agent. The pastes are typically anhydrous. Water is not necessary and is typically avoided in making the paste.

The compatibilizing agents used herein in the conductive composites comprise a nonionic amphiphilic compound, an ionic amphiphilic compound, metallic nanoparticles, or a mixture thereof.

Preparation of the pastes can be accomplished by, for example, mixing the low melting conductor, compatibilizing agent, and any optional components with centrifugal planetary mixer. The resulting paste can be stored for future use.

The compatibilizing agents used herein unexpectedly improve the workability (e.g., flowability, ease of application) of the paste. Without wishing to be bound by theory, it is believed that the mixing of the compatibilizing agent with the low melting conductor produces a coating of compatibilizing agent on the surface of particles or droplets of the low melting conductor, and as a result lowers the surface energy of the low melting conductor. In addition, again without wishing to be bound by theory, it is believed that the compatibilizing agent forms a monolayer or several layers on the low melting conductor droplets and reduces or prevents oxidation of the conductor, but it does not create a shell of the kind that results from using acids.

In certain examples, the compatibilizing agents used herein can also be used to thicken the paste, i.e., to increase the viscosity of the paste.

In addition, compatibilizing agent can be added to revitalize a paste if oxidation has occurred on the surface of the metal. As used herein, "revitalize" means that a mixture of compatibilizing agent and low melting conductor that has separated can be returned to the form of a uniform paste by incorporating additional compatibilizing agent into the separated mixture and subjecting the mixture to appropriate shear conditions as discussed below.

In examples in which the paste includes particles of a thickening agent, as discussed elsewhere herein, the disclosed compatibilizing agents are believed to permit penetration into pores or voids formed between particles of the thickening agent. It is believed, without being bound by theory, that the compatibilizing agent aids penetration by reducing the viscosity of the liquid material in the paste. Penetration into pores is believed to permit the use of less low melting conductor and to provide homogeneity to the paste.

In certain examples, the pastes used to form the conductive composites contain the low melting conductor and the compatibilizing agent at a weight ratio of low melting conductor to compatibilizing agent of from about 5:1 to 50:1, or from about 10:1 to 30:1, or from about 15:1 to 25:1, or from about 20:1 to 25:1. Thus, the amount of compatibilizing agent as a percentage of the low melting conductor ranges from about 2 weight % to about 20 weight %. Particularly useful amounts of compatibilizing agent as a percentage of the low melting conductor ranges from about 4 weight % to 10 weight %. Phase separation is to be avoided. At higher levels of compatibilizing agent, phase separation may occur and this can be addressed using a thickening agent of the kind disclosed elsewhere herein.

In certain examples, the compatibilizing agent comprises inorganic, e.g., metallic, nanoparticles having a size less than 100 nm, or less than about 90 nm, or less than about 80 nm, or less than about 70 nm, or less than about 60 nm, or less than about 50 nm, or less than about 40 nm, or less than about 30 nm, or less than about 20 nm, in any linear dimension. Suitable nanoparticles comprise metals that are insoluble, i.e., do not dissolve, in the low melting conductor. Suitable metals for use as the nanoparticles are those in which gallium has less than 5 mol % solubility in the metal at room temperature. Examples of suitable metals for use as nanoparticle compatibilizing agents herein include copper, nickel, stainless steel, tin, titanium, tungsten, mixtures thereof, and alloys thereof.

In certain examples, the compatibilizing agent is a non-ionic amphiphilic compound or mixture of nonionic amphiphilic compounds. Suitable nonionic amphiphilic compounds include fatty alcohol alkoxylates including fatty alcohol ethoxylates, alkylphenol alkoxylates including alkylphenol ethoxylates, fatty acid alkoxoxylates including fatty acid ethoxylates, alkoxylated amines including ethoxylated amines, fatty acid amides, polyoxyethylene-polyoxypropylene copolymers, fatty acid esters of polyhydroxy compounds, glycerol fatty acid esters, sorbitan fatty acid esters, sucrose fatty acid esters, alkyl polyglucosides, fatty amine oxides, sulfoxides, organophosphine oxides, and mixtures thereof.

In certain examples, the compatibilizing agent is an ionic compound. Suitable ionic amphiphilic compounds include anionic compounds and cationic compounds. Representative anionic compounds are alkyl sulfates, alkyl ether sulfates, alkyl sulfonates, alkyl ether sulfonates, alkyl phosphates, and alkyl carboxylates. Representative cationic compounds are quaternary ammonium compounds, monoalkylammonium salts, dialkylammonium salts, and trialkylammonium salts.

The choice of the particular anionic compound (or mixture thereof) or cationic compound (or mixture thereof) and the amount thereof used to form the conductive paste will be determined by the particular polymer used to manufacture the conductive composite. The type and amount of the anionic or cationic compound will be selected to avoid degrading or depolymerizing the polymer.

In certain examples, the compatibilizing agent is a surfactant.

In certain examples, the compatibilizing agent is a nonionic amphiphilic compound or a mixture of such compounds. Particularly useful nonionic amphiphilic compounds are the alkylphenol ethoxylates. Representative alkylphenol ethoxyates are octylphenol ethoxylates such as Triton™ X-100 (polyethylene glycol p-(1,1,3,3-tetramethylbutyl)-phenyl ether having an average of 9.5 ethylene oxide units) and nonylphenol ethoxylates.

Other particularly useful nonionic amphiphilic compounds are the poloxamer, which are tri-block copolymers of poly(ethylene oxide) poly(propylene oxide)-poly(ethylene oxide) (PEO-PPO-PEO).

In certain examples, the conductive composites also include an optional thickening agent. When used, the thickening agent is typically combined with the low melting conductor and the compatibilizing agent and is, as a result, a component of the paste or conductive mixture layer.

The thickening agents used herein function as viscosity modifiers and can aid in resisting or minimizing flow of the low melting conductor within the paste. The thickening agents used herein may be inorganic or organic materials. The thickening agents do not dissolve the conductor or otherwise form solutions with the conductor; they remain solid when mixed with the conductor, but are wet by the conductor. The thickening agents are typically used as particles, e.g., rods, wires, substantially spherical particles, or mixtures thereof, and the particle size dictates how readily the powder homogenizes with the conductor to form a paste. Typically, thickening agents that have higher surface areas will be better thickeners than agents with lower surface areas. Combinations of thickening agent and conductor, e.g., gallium alloy, are selected to achieve the appropriate wetting of the thickening agent and rheology or modulus of the paste. The particle sizes and quantities are selected to produce paste compositions have a tan delta value greater than 1, i.e., pastes that behave more like a liquid than a solid, permitting the resulting composite to be flexible.

In certain examples, the thickening agent comprises particles, e.g., rods or wires, of an inorganic thickening agent having an aspect ratio greater than 2, i.e., where the length is at least twice the width. Aspect ratio can be measured using a microscope.

In certain examples, the thickening agent comprises substantially spherical particles of an inorganic thickening agent having an average particle size of about 0.1-500 µm (100-500,000 nm). Particles of this size range have sufficient surface area to function as thickening agents to form a paste with the conductor. In certain examples, the thickening agent comprises substantially spherical particles of an inorganic thickening agent having an average particle size of about 1-25 µm, or of about 25-50 µm, or of about 50-75 µm, or of about 75-100 µm, or of about 100-150 µm, or of about 150-200 µm, or of about 200-250 µm, or of about 250-300 µm, or of about 300-350 µm, or of about 350-400 µm, or of about 450-500 µm. In other examples, the thickening agent comprises substantially spherical particles of an inorganic thickening agent having an average particle size of about 50-150 µm. In certain examples, the particles of inorganic thickening agent having an average size of about 0.1-5 µm.

In an example, the thickening agent is an inorganic thickening agent having an aspect ratio greater than 2 and comprising rods or wires having lengths of about 0.01-10 mm. In certain examples, the rods of inorganic thickening agent have lengths of about 0.01-0.5 mm, or about 0.05-10 mm, or about 0.01-10 mm, or about 0.01-10 mm, or about 0.01-0.1 mm, or about 0.1-1 mm, or about 0.1-1 mm, or about 1-5 mm, or about 5-10 mm. Use of rods or wires contributes to the conductivity of the final composite to a larger extent than generally spherical particles. As a result, the amount of paste necessary to realize a certain degree of conductivity can be reduced. The reduction in the amount of paste used to make the composite can be accomplished by reducing either the amount of the conductor or the amount of the thickening agent.

In certain examples, the inorganic thickening agent comprises a mixture of rods or wires and substantially spherical particles or comprises a mixture of rods, wires, and substantially spherical particles.

In certain examples, the thickening agent comprises particles of an organic thickening agent having an average particle size of about 0.1-500 µm. In certain examples, the thickening agent comprises particles of an organic thickening agent having an average particle size of about 1-25 µm, or of about 25-50 µm, or of about 50-75 µm, or of about 75-100 µm, or of about 100-150 µm, or of about 150-200 µm, or of about 200-250 µm, or of about 250-300 µm, or of about 300-350 µm, or of about 350-400 µm, or of about 450-500 µm. In other examples, the thickening agent comprises particles of an organic thickening agent having an average particle size of about 50-150 µm. In certain examples, the particles of organic thickening agent having an average size of about 0.1-5 µm.

In examples in which the paste also includes a thickening agent, the thickening agent can be used in an amount that produces an appropriate viscosity and/or to modulate the conductive properties of the paste and resulting composite. Suitable concentrations of inorganic thickening agent in the pastes range from about 0.1% to 20% by weight of the paste composition. Suitable concentrations of organic thickening agent in the pastes range from about 0.1% to 40% by weight of the paste composition.

Suitable volume-based amounts of the thickening agent in the paste composition range from about 5-50% by volume of the paste. In certain examples, the amount of the thickening agent is from about 5% to about 10%, or about 5 to about 15%, or about 10 to about 20%, or about 15 to about 25%, or about 20 to about 30%, or about 25 to about 35%, or about 30 to about 45% by volume of the paste composition. Such amounts are convenient for producing paste compositions have a tan delta value greater than 1, i.e., pastes that behave more like a liquid than a solid, permitting the resulting composite to be flexible.

As explained above, the amount of thickening agent can be reduced when rods or wires are used as the thickening agents. Suitable amounts of rod or wire thickening agents in the paste range from about 2-40% by volume of the paste. In certain examples, the amount of the thickening agent is from about 2% to about 5%, or about 5 to about 10%, or about 10 to about 15%, or about 15 to about 20%, or about 20 to about 25%, or about 25 to about 30%, or about 30 to about 40% by volume of the paste composition.

Suitable electrical conductivity can be achieved in the conductive composites disclosed herein without resorting to high amounts of solid conductive particles in the paste, i.e., loadings of such particles greater than about 45 volume percent. However, in certain examples metallic particle loadings greater than 45 volume percent may be employed in the paste if insufficient metal exists in the liquid phase to form a desired level of electrical connections between metallic particles. Thus, particle loading levels above 45 volume percent, e.g., between about 45 and 80 volume percent, may be used in the paste when necessary.

In certain examples, the thickening agent used to make the conductive composite is an organic thickening agent. Suitable organic thickening agents include compounds having a melting point above 60° C., i.e., a temperature that will prevent the thickening agent from melting with the alloy, i.e., prior to or during manufacture of the composite. Examples of such compounds are maltol, phenol, naphthalene, 1-naphthol, 2-naphthol, 4-pyridone, and carbon, including, for example, graphite and carbon black. Where the organic thickening agent is a compound having a phenolic hydroxy group, the compound can react with the isocyanate groups of a di- or polyisocyanate via the hydroxy, but the reaction would be slower than the urethane or urea forming reactions. Used appropriately, such compounds can be used to modify the characteristics of the resulting polymer. Alternatively, the organic thickening agent can be graphite or carbon particles.

In certain examples, the thickening agent is an inorganic thickening agent or a combination of inorganic thickening agents. Suitable inorganic thickening agents include metal oxides such as titanium dioxide and zinc oxide, a metal having a melting point above 60° C., or a ceramic material. The metal is selected to have a melting point above 60° C. to prevent the thickening agent from melting prior to or during manufacture of the composite. Suitable metals include nickel, a metal oxide of nickel, titanium, tungsten, stainless steel, copper, tin, zinc, a ceramic, or a combination thereof.

The conductive composites disclosed herein comprise from about 0.1 to about 50% by volume of the conductor. The amount of conductor will be dictated by the expected use of the composite and by the type and amount of other conductors in the composite. Typically, in the absence of other conductors, higher conductivities will require larger percentages of the conductor. Of course, lower volumes of the conductor can be employed when the conductor has a relatively high conductivity. In certain examples, the conductive composites include from about 0.1 to about 30, or about 0.1 to about 20, or about 0.1 to about 10% of the conductor by volume. In other examples, the conductive composites include from about 0.5 to about 30, or about 0.5 to about 20, or about 0.5 to about 10% of the conductor by volume. In still other examples, the conductive composites include from about 1 to about 30, or about 1 to about 20, or about 1 to about 10% of the conductor by volume. In yet other examples, the conductive composites include from about 5 to about 30, or about 5 to about 20, or about 5 to about 10% of the conductor by volume. In certain examples, the amount of the conductor is from about 2% to about 10%, or about 1% to about 5%, or about 2% to about 5%, or about 5 to about 15%, or about 10 to about 20%, or about 15 to about 25%, or about 20 to about 30%, or about 25 to about 35%, or about 30 to about 45% by volume of the composite.

The thickening agent may be a mixture of at least one organic thickening agent and at least one inorganic thickening agent. A mixture of organic and inorganic thickening agents can be used to modify the rheology or modulus of the paste.

In certain examples, the thickening agent comprises rods, wires, substantially spherical particles, or a mixture thereof, and the rods, wires, and substantially spherical particles comprise a metal selected from nickel, titanium, tungsten, stainless steel, copper, tin, a metal oxide of nickel, zinc, ceramics, and combinations thereof, wherein the substantially spherical particles have an average size of about 0.1-500 um (100-500,000 nm) and the rods and wires have lengths of from 0.01-10 mm.

The disclosure provides a paste composition comprising a metal or metal alloy having a melting temperature below 60° C., e.g., a low melting conductor, and a compatibilizing agent, and optionally one or more thickening agents. In another example, the paste composition comprises a metal or metal alloy having a melting temperature below 60° C., a compatibilizing agent, and at least one thickening agent selected from organic thickening agents an inorganic thickening agent.

In certain examples, the paste compositions disclosed herein and useful for preparing the conductive composites can have a loss modulus (G") greater than the storage modulus (G'), i.e., the paste compositions have a tan delta value greater than 1. Paste compositions of this disclosure therefore behave more like liquids than solids. The paste compositions of this disclosure have viscosities of from 500-100,000 Pa·s at 1 Hz when measured using a dynamic shear rheometer according to ASTM D7175.

The conductive composites disclosed herein can be made by combining:
  (i) a paste comprising a low melting conductor and a compatibilizing agent and an optional thickening agent with
  (ii) a mixture of monomers to form an intermediate composition.

After combining these materials, the resulting intermediate composition may be permitted to cure to form the composite. Depending on the choice of starting materials, the composite will be rigid or flexible. It can also be thermoplastic, i.e., flexible when heated.

Alternatively, the conductive composites disclosed herein can be made by combining:
  (i) a paste comprising a low melting conductor and a compatibilizing agent and an optional thickening agent with
  (ii) a polymer or mixture of polymers.

If necessary, after combining these materials, the polymers are permitted to cure to form the composite. Depending on the choice of starting materials, the composite will be rigid or flexible. It can also be thermoplastic, i.e., flexible when heated.

Laminate composites of this disclosure can be made by layering a conductive paste onto the surface of a first polymer, wherein the conductive paste comprises (a) a conductor selected from metals and metal alloys having a melting temperature below about 60° C. and; and (b) a compatibilizing agent, and optionally applying a layer of a second polymer over the conductive paste. The second polymer may be the same or different than the first polymer. Adding a layer of the second polymer will encapsulate the conductive paste.

Laminate conductive composites of this disclosure can also be made by spreading a conductive paste onto a non-stick surface, applying uncured polymer over the paste, and then curing the polymer. The composite can then be conveniently removed from the non-stick surface by peeling the composite from the non-stick surface. Where necessary, a second polymer (which may be the same or different than the first polymer) can optionally be applied over the conductive paste. Adding a layer of the second polymer will encapsulate the conductive paste.

The non-stick surface can be any suitable non-stick material. Examples of suitable non-stick materials include polytetrafluoroethylene, anodized aluminum, ceramics, and enameled cast iron.

The conductive composites disclosed herein can also comprise additional materials to impart other characteristics to the composites. For example, a thermo-oxidative stabilizer (a material or an additive that increases thermal oxidative stability) can be included into either the polyol, the di- or polyisocyanate, or the paste composition prior to forming the composite. Depending on the characteristics needed in the composite and the environment in which the composite will be deployed, the thermo-oxidative stabilizer can be a phosphate, iron oxide, phenolic antioxidant, metal passivator, or combination thereof. Addition of a thermo-oxidative stabilizer to the conductive composites disclosed herein expands the operating temperature range of the composite.

Suitable metal passivators include nitrates such as nitric acid, citrates such as citric acid, tungstates, molybdates, chromates, and mixtures thereof.

The sheet resistivity of a particular conductive composite will depend on the ultimate use. For example, a minimum sheet resistance of less than 100 Ohm/sq is preferred when the composite is to be used to shield electrical components from electromagnetic radiation, e.g., to minimize electromagnetic interference that may disrupt or harm sensitive electronics.

In certain examples, the conductive composites disclosed herein exhibit a maximum bulk conductivity of about $5 \times 10^5$ S/m at 20° C.

In certain examples, the conductive composites disclosed herein exhibit an elongation greater than or equal to 50%.

In other examples, the conductive composites disclosed herein exhibit a tensile strength greater than or equal to 3 MPa.

In certain examples, the conductive composites disclosed herein exhibit a maximum bulk conductivity of about $5 \times 10^5$ S/m at 20° C., an elongation greater than or equal to 50%, and a tensile strength greater than or equal to 3 MPa.

In certain examples, the conductive composites disclosed herein comprise:
  an elastomer;
  a low melting conductor; and
  a compatibilizing agent,
    wherein the conductive composite has or exhibits a maximum bulk conductivity about $5 \times 10^5$ S/m at 20° C., an elongation greater than or equal to 50%, and a tensile strength greater than or equal to 3 MPa.

Sheet resistivity is a standard measurement and can be determined using a four point probe.

In certain examples, the conductive composite is flexible and has an elongation greater than about 50%. In other examples, the conductive composite is flexible and has an elongation greater than about 10%, or greater than about 20%, or greater than about 30%, or greater than about 40%. Flexible conductive composites of this disclosure preferably comprise a thermoplastic elastomer. In an example, the thermoplastic elastomer is a thermoplastic polyurethane.

In certain examples, the conductive composite has an elongation greater than about 50%. In other examples, the conductive composite has an elongation greater than about 10%, or greater than about 20%, or greater than about 30%, or greater than about 40%.

In certain examples, the conductive composite is flexible and has a tensile strength greater than or equal to 3 MPa. In certain examples, the conductive composite is flexible. In certain examples, the conductive composite has a tensile strength greater than or equal to 3 MPa.

In certain examples, the conductive composite has a density of between about 2 and 10 g/mL. In other examples, the conductive composite has a density between about 10 and 20/mL. In still other examples, the conductive composite has a density between about 1 and 5 g/mL, or between about 3 and 8 g/mL. In an example, the conductive composite has a density less than 7 g/mL. This parameter can readily be measured by determining the mass of a known volume or measuring the volume of water displaced by a known mass.

This disclosure also provides products, items, and structures comprising a substrate carrying a layer of a conductive composite disclosed herein, and in certain examples a flexible conductive composite as disclosed herein. Such products, items, and structures can be made by heating a thermoplastic or thermoset conductive composite as disclosed herein and applying it to a substrate.

Conductive composites disclosed herein can be made as follows:

A paste composition is prepared by combining the low melting conductor with the compatibilizing agent and mixing the resulting mixture sufficiently to form a uniform paste. The mixing can be accomplished with a shear mixer at about 25-2500 rpm. In certain examples, the shear mixing to form the paste composition is carried out at about 25-125 rpm, or at about 125-250 rpm, or at about 250-400 rpm, or at about 400-700 rpm, or at about 700-1500 rpm, or at about 1500-2500 rpm. Alternatively, the mixing can be carried out using a centrifugal planetary mixer. The resulting paste can be stored for future use.

In certain examples, the conductive composites of this disclosure can be made by layering a conductive paste onto the surface of a first polymer, wherein the conductive paste comprises (a) a conductor selected from metals and metal alloys having a melting temperature below about 60° C. and;

and (b) a compatibilizing agent. The second polymer can be the same or different than the first polymer.

EXAMPLES

Material Sources

Krasol® LBH-P2000 is obtained from Cray Valley and used as received. Desmophen® NH 1220 is purchased from Covestro and used as received. Ga alloy (Indalloy 46L) is purchased from Indium Corporation and used as received. Maltol, titanium powder (size about 100 mesh), 4,4'-methylenebis(cyclohexyl isocyanate), mixture of isomers (HMDI), and dibutyltin dilaurate (DBTDL) are purchased from Sigma Aldrich and used as received. Stainless steel wires (3 mm×2 μm) are purchased from Intramicron and used as received. Polydimethylsiloxane (Sylgard™ 184) is obtained from Dow Corning and used as received. Stainless steel powder (type 316, 325 mesh (44 um)) was purchased from Atlantic Equipment Engineers and washed with acetone prior to use.

Volume percentages of the low melting conductor, gallium, were determined by back-calculating the gallium alloy fraction in the composite after sample fabrication.

Example A: Preparation of Polyurethane Prepolymer (Part A)

Hydroxyl-terminated polybutadiene (Krasol® LBH-P2000, $M_n$=2100 g/mol, 50.00 g, 23.8 mmol) and HMDI (19.65 g, 74.89 mmol) is placed in a round-bottom flask that contains an inlet for nitrogen and is equipped with an overhead stirrer (Teflon® shaft and blade). The flask is placed in an oil bath at 100° C. and stirred at 175 rpm for 10 mins. DBTDL (500 ppm) catalyst is then added to the solution using a micropipette and the reaction is allowed to proceed for 2 h, forming a prepolymer (part A). Neat part A (no solvent) is poured into a glass jar and stored for future use.

Comparative Example C-1

Preparation of Paste:

18.51 g Ga alloy (Indalloy® 46L) and 3.02 g maltol (thickening agent) are mixed using a shear mixer for approximately 5 minutes at ≤100 rpm.

Preparation of composite containing 21.8 volume % Ga alloy (paste): Part A (7.64 g) and Ga alloy-maltol paste (21.53 g) are mixed using a shear mixer for approximately 5 minutes at less than or equal to 100 rpm. NH1220 (2.56 g) is added to the resulting homogeneous mixture, and hand-mixed with a spatula for a minute. The mixture is then transferred to a Teflon mold and a blade applicator is used to cast a thin film.

Comparative Example C-2

Preparation of Paste:

27.23 g Ga alloy (Indalloy® 46L) and 5.86 g titanium powder (thickener, about 100 mesh) are mixed using a shear mixer for approximately 5 minutes at less than or equal to 100 rpm.

Preparation of Composite Containing 27.8 Volume % Ga Alloy (Paste):

Part A (8.15 g) and Ga alloy-Ti paste (33.09 g) are mixed using a shear mixer for few minutes at less than or equal to 100 rpm. NH1220 (2.73 g) is added to the resulting homogeneous mixture, and hand-mixed with a spatula for a minute. The mixture is then transferred to a polytetrafluoroethene (PTFE) mold (e.g., Teflon® brand PTFE) and a blade applicator is used to cast a thin film.

Comparative Example C-3

Preparation of Paste:

29 g Ga alloy (Indalloy® 46L) and 5.17 g titanium powder (thickener, about 100 mesh) are mixed using a shear mixer for approximately 5 minutes at less than or equal to 100 rpm. Stainless steel wires (0.52 g, 3 mm×2 μm) are then added into the paste and mixed under the same conditions.

Preparation of composite containing 29.1 volume % Ga alloy (paste): Part A (8.13 g) and Ga alloy-based paste (34.69 g) are mixed using a shear mixer for few minutes at less than or equal to 100 rpm. NH1220 (2.73 g) is added to the resulting homogeneous mixture, and handmixed with a spatula for a minute. The mixture is then transferred to a Teflon® brand mold and a blade applicator is used to cast a thin, i.e., 1-2 mm thickness, film.

Comparative Example C-4

Silicone Sponge with Ga Alloy
Preparation of Silicone Sponge:

A silicone sponge is prepared essentially according to a procedure described by from Liang et al. in J. Mater. Chem. C, 2017, 5 (7), 1586-1590, as follows:

20 g Sylgard™ part A and 2 g part B are mixed using a centrifugal mixer for 30 second at 2300 rpm, and followed by immersing 4 sugar cubes. The sugar cubes with polydimethylsiloxane (PDMS) mixture are then placed in a desiccator and degassed under vacuum for approximately 2 h. The sugar cubes with PDMS mixture are then cured at 65° C. for 3 h. Afterward, PDMS on the surface is wiped off to expose the sugar. The sugar is dissolved in 60° C. water with stirring. The PDMS sponges are obtained by drying at 100° C. for 2 h.

Preparation of Sponge Containing about 53 Volume % Ga Alloy:

One silicone sponge is cut in half and immersed in 15 g Ga alloy. The container is then placed in a desiccator. Ga alloy liquid metal was filled into the PDMS sponge using vacuum for approximately 60 min.

Figure 3:
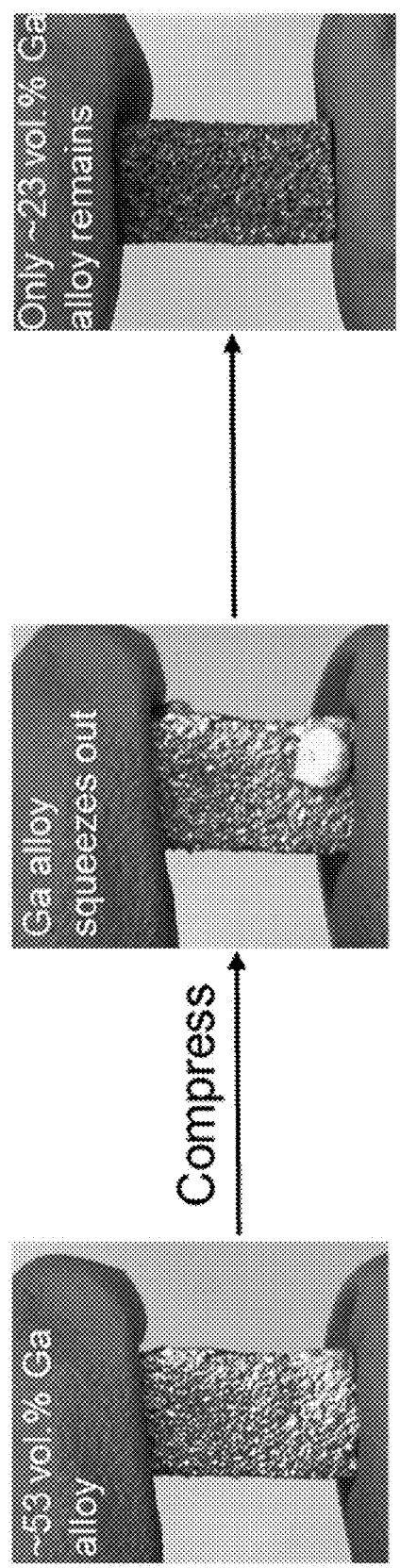
FIG. 3 is a series of photographs showing, in the direction of the arrow, the effect of compression on a silicone sponge filled with gallium alloy.

FIG. 3 shows the effect of compression on the Ga alloy-filled silicone sponge. As shown in FIG. 3, upon compression, Ga alloy leaks out of silicone sponge as a droplet of the liquid metal; after compression only about 23 volume % of the Ga alloy remains in silicone sponge. This is determined by weighing the sponge prior to and after compression.

Comparative Example C-5

Nusil™ LSR-5860 Liquid Silicone Rubber Control
Preparation of Film:

10 g Nusil™ LSR-5860 Liquid Silicone Rubber Part A and 10 g Nusil™ LSR-5860 Liquid Silicone Rubber Part B were mixed using a FlackTek® centrifugal planetary mixer for 1 min at 2300 rpm. 10 g of tetrahydrofuran (THF) was added to the mixture, and handmixed with a spatula for several minutes until the mixture was fully dissolved in THF, then the mixture was mixed again using a FlackTek® mixer for 1 minute at 2300 rpm. The resulting homogeneous mixture was poured on top of a release film and cast ed with a glass rod. Then the thin film was heat cured at 100° C. for 2 hours after most THF solvent evaporated (about 18 hours/overnight).

Comparative Example C-6

Sylgard™ Control

Preparation of film: 10 g Sylgard™ 184 Part A and 1 g Sylgard™ 184 Part B were mixed using a FlackTek centrifugal planetary mixer for 1 minute at 2300 rpm. The mixture was poured on top of a release film and casted with a glass rod. The thin film was heat cured at 100° C. for 45 minutes.

Example 1

Preparation of Paste:

60.13 g Ga alloy (Indalloy®46L) and 3 g Triton™ X100 were mixed using a FlackTek centrifugal planetary mixer for 1 minute at 2300 rpm. 6.63 g stainless steel powder (a thickener, 325 mesh (44 um)) was added into the paste and mixed under the same conditions.

Preparation of Laminate Composite Containing 15.5 vol. % Ga Alloy (Paste):

A Nusil 5860 thin film was made using the film preparation procedure described in Comparative Example C-5. Once the film was cured, 1 g of the Ga-based paste prepared above in this example was spread evenly over a 1.5"×1.5" cured film. Following the Comparative Example C-5 film preparation again, 5 g mixture of Nusil 5860 Part A and Part B was dissolved in 5 g of THF. The resulting polymer solution was cast atop the Ga-based paste, and heat cured at 100° C. for 2 hours after most THF solvent evaporated (about 18 hours/overnight). The resulting product is a 1.5"×1.5" laminate film composite.

Example 2

Preparation of Paste:

75.21 g Ga alloy (Indalloy® 46L) and 3.21 g of Triton™ X100 were mixed using a FlackTek centrifugal planetary mixer for 1 minute at 2300 rpm. 5.45 g stainless steel powder (thickener, 325 mesh (44 um)) was added into the paste and mixed under the same conditions. Lastly, 4.73 g stainless steel wire (3 mm×2 μm, a thickener) was added into the paste, handmixed with a spatula for a minute, then mixed in a FlackTek® mixer for 1 minute at 2300 rpm.

Preparation of Composite Containing 7.7 vol. % Ga Alloy (Paste):

A Sylgard™ 184 thin film was made using the film preparation procedure described in Comparative Example C-6. Once the film was cured, 1.82 g of the Ga-based paste prepared above in this example was spread evenly over a 1.5"×1.5" cured film. Additional 3 g Sylgard™ Part A and Part B mixture was cast on top of the Ga-based paste to fully encapsulate the laminate composite, and heat cured at 100 CC for 45 minutes. The resulting product is a 1.5"×1.5" laminate film composite.

Example 3

Preparation of Paste:

25.83 g Ga alloy (Indalloy® 46L) and 1.07 g Triton™ X100 were mixed using a FlackTek centrifugal planetary mixer for 1 minute at 2300 rpm.

Preparation of Laminate Composite Containing 14.1 vol. % Ga Alloy (Paste):

A Nusil 5860 thin film was made using the film preparation procedure described in Comparative Example C-5. Once the film was cured, 0.59 g of the Ga-based paste prepared above was spread evenly over a 1.5"×1.5" cured film. Following the Comparative Example C-5 film preparation again, a mixture of 5 g of Nusil 5860 Part A and Part B was dissolved in 5 g of THF. The resulting polymer solution was cast atop the Ga-based paste, and heat cured at 100° C. for 2 hours until most of the THF solvent had evaporated (about 18 hours/overnight). The resulting product is a 1.5"×1.5" laminate film composite.

Example 4

Thermal Aging:

The Comparative Example C-5 film and the laminate films fabricated in Examples 1-3 were placed in an oven at 100° C. for 10 days and evaluated for either conductivity performance and/or or elongation.

After cure, the composites described in Comparative Example C-1, Comparative Example C-2 and Comparative Example C-3 could be easily handled and cut into dog bones for mechanical testing.

Table 1 below summarizes the tensile properties (elongation and instant failure stress) of the thermoplastic polyurethane control and Ga-based paste containing composites. Suitable devices for measuring these characteristics are commercially available from Instron, Norwood, Mass., USA.

These composites demonstrate the sensitivity of elastomeric compositions to Galium alloy loading levels and demonstrate that the methods and compositions disclosed herein to result in composites exhibiting excellent elasticity coupled with high metallic content.

TABLE 1

Mechanical properties of Ga alloy-based composites

| Composite | Vol % Ga Alloy | % Elongation | Instant Failure Stress (MPa) |
|---|---|---|---|
| Thermoplastic Polyurethane (part A + NH1220) (n = 5) | 0 | 556 ± 31 | 60.2 ± 6.3 |
| Film obtained from Comparative Example C-1 (n = 5) | 21.8 | 296 ± 16 | 9.5 ± 1.2 |
| Film obtained from Comparative Example C-2 (n = 5) | 27.8 | 359 ± 36 | 13.7 ± 2.2 |
| Film obtained from Comparative Example C-3 (n = 5) | 29.1 | 231 ± 42 | 9.67 ± 1.6 |
| Film obtained from Comparative Example C-4 (n = 2) | 0 | 462 ± 15/ 496 ± 24* | 46.6 ± 3.2/ 50.4 ± 3.8* |
| Film obtained from Comparative Example C-6 (n = 3) | 0 | 78.2 ± 1.4 | 2.0 ± 0.1 |

*indicates that the sample was aged for 10 days at 100° C. in air and tested before and after aging.

Table 1 demonstrates that the film of Comparative Example C-5 exhibits no degradation in mechanical properties upon aging of the film.

Electrical conductivity values, determined as attenuation in dB/mm, of composites made according to Comparative Example C-1, Comparative Example C-2, Comparative Example C-3, Example 1, Example 2, and Example 3 are summarized in Table 2. All attenuation results reported are normalized to remove sample thickness as a variable.

A full 2-port measurement of X-band waveguide covering 8-12 GHz is used to determine attenuation. A composite sample is compressed between the 2 X-band waveguides which are connected to a Keysight N5245A Network Analyzer via waveguide-to-coax transitions. A full 2-port calibration is performed with the empty waveguides as a thru standard. A measurement of the empty waveguides is captured to remove the waveguide losses in post-processing.

Some samples are initially measured with a center cutout identical to the waveguide opening to ensure proper electrical seal and determine the amount of loss due to RF leakage followed by a second measurement with a full square sample. Other samples are measured as-is.

Attenuation improved when moving from organic to inorganic thickening agents. The combination of inorganic particle plus anisotropic metallic wire resulted in the highest electrical conductivity (−16 dB/mm) for the non-laminate composites.

Example 2, which is a laminate containing both stainless steel powder thickener and micron sized wire additives in addition to compatibilizing agent, produced an attenuation of −29 dB/mm with only approximately 7.7 volume % Gallium alloy. This demonstrates that high conductivity is achieved with the disclosed conductive composites using relatively low loading levels of the low melting conductor.

The laminate composites of, Example 1 and Example 2, were also heat aged in air at 100° C. for 10 d and showed no loss in electrical conductivity.

TABLE 2

Electrical conductivity of elastomeric Ga-containing composites

| Composite | Vol % Ga Alloy | Attenuation (dB/mm) | Post Aging Attenuation (dB/mm) |
|---|---|---|---|
| Film obtained from Comparative Example C-1 (n = 1) | 21.8 | −1 | not determined |
| Film obtained from Comparative Example C-2 (n = 1) | 27.8 | −6 | not determined |
| Film obtained from Comparative Example C-3 (n = 1) | 29.1 | −16 | not determined |
| Film obtained from Example 1 (n = 1) | 15.5 | −14 | −25 |
| Film obtained from Example 2 (n = 1) | 7.7 | −29 | −27 |
| Film obtained from Example 3 (n = 1) | 14.1 | −18 | −21 |

Having described the conductive composites and methods for preparing using the composites in detail and by reference to specific examples thereof, it will be apparent that modifications and variations are possible without departing from the scope of what is defined in the appended claims. More specifically, although some aspects of the present disclosure are identified herein as particularly advantageous, it is contemplated that the present disclosure is not necessarily limited to these particular aspects of the disclosure.

Clause 1. A conductive composite comprising:
(a) a polymer;
(b) a conductor selected from metals and metal alloys having a melting temperature below about 60° C.; and
(c) a compatibilizing agent.

Clause 2. A conductive composite according to clause 1, wherein the compatibilizing agent comprises a nonionic amphiphilic compound, an ionic amphiphilic compound, metallic nanoparticles, or a mixture thereof.

Clause 3. A conductive composite according to clause 2, wherein the metallic nanoparticles have a size less than 100 nm in any linear dimension and comprise copper, nickel, stainless steel, tin, titanium, tungsten, mixtures thereof, and alloys thereof.

Clause 4. A conductive composite according to clause 2 or clause 3, wherein the nonionic amphiphilic compound is selected from the group consisting of fatty alcohol ethoxylates, alkylphenol ethoxylates, fatty acid ethoxylates, ethoxylated amines, fatty acid amides, polyoxyethylene-polyoxypropylene copolymers, fatty acid esters of polyhydroxy compounds, glycerol fatty acid esters, sorbitan fatty acid esters, sucrose fatty acid esters, alkyl polyglucosides, fatty amine oxides, sulfoxides, organophosphine oxides, and mixtures thereof.

Clause 5. A conductive composite according to any one of clauses 2-4, wherein the nonionic amphiphilic compound is a surfactant.

Clause 6. A conductive composite according to any one of clauses 1-5, wherein the polymer comprises a thermoset or thermoplastic polymer.

Clause 7. A conductive composite according to any one of clauses 1-5, wherein the polymer comprises a polyamide, polylactic acid, polystyrene, acrylonitrile butadiene styrene, polybenzimidazole, polycarbonate, polyether sulfone, polyoxymethylene, polyaryletherketone, polyetherimide, polyethylene, polypropylene, polyphenylene oxide, polyphenylene sulfide, polyvinyl chloride, polyester, polyvinylidene fluoride, silicone, perfluoropolyether, polybutadiene, polyacrylate, polyetherimide, polyurethane, polyurea/polyurethane hybrid, thermoplastic vulcanizate, polytetrafluoroethylene, polyepoxide, polyimide, cyanate ester, polycyanurate, polysulfide, or a copolymer or mixture thereof.

Clause 8. A conductive composite according to any one of clauses 1-5 wherein the conductor is an alloy comprising at least about 50% by weight of gallium, bismuth, mercury, or combinations thereof.

Clause 9. A conductive composite according to clause 8, wherein the alloy further comprises indium, tin, phosphorous, lead, zinc, cadmium, antimony, or a combination thereof.

Clause 10. A conductive composite according to any one of clauses 1-9, wherein the conductor is an alloy comprising indium and 50-97% by weight of gallium.

Clause 11. A conductive composite according to any one of clauses 1-10, wherein the conductor is an alloy comprising about 15-30% by weight of indium, about 55-80% by weight of gallium, and at least one metal selected from tin and zinc.

Clause 12. A conductive composite according to any one of clauses 1-11, further comprising a thickening agent.

Clause 13. A conductive composite according to clause 12, wherein the thickening agent is an organic thickening agent.

Clause 14. A conductive composite according to clause 12, wherein the thickening agent is maltol, carbon, phenol, naphthalene. 1-naphthol, 2-naphthol, or 4-pyridone.

Clause 15. A conductive composite according to clause 12, wherein the thickening agent is an inorganic thickening agent.

Clause 16. A conductive composite according to clause 12, wherein the thickening agent comprises rods, wires, substantially spherical particles, or a mixture thereof, and comprises a metal selected from nickel, titanium, tungsten, stainless steel, copper, tin, a metal oxide of nickel, titanium, tungsten, stainless steel, copper, tin, or zinc, ceramics, and combinations thereof,
wherein the substantially spherical particles have an average size of about 0.1-500 urn and the rods and wires have lengths of from 0.01-10 mm.

Clause 17. A conductive composite according to any one of clauses 1-16, wherein the conductive composite comprises from about 0.1-50% by volume of the conductor.

Clause 18. A conductive composite according to any one of clauses 1-17 which is a laminate.

Clause 19. A conductive composite according to clause 18, wherein the conductor and compatibilizing agent are substantially uniformly mixed together and form a layer of the laminate.

Clause 20. A conductive composite according to any of clauses 1-17, wherein the conductor and the compatibilizing agent are substantially uniformly dispersed throughout the polymer.

Clause 21. A conductive composite according to clause 20, wherein the conductor is continuously entrapped within the polymer as a network comprising the conductor and the compatibilizing agent.

Clause 22. A conductive composite according to any one of clauses 1-21, wherein the conductive composite has a bulk conductivity of no more than about $5 \times 10^5$ S/m at 20° C., an elongation greater than or equal to 50%, and a tensile strength greater than or equal to 3 MPa.

Clause 23. A conductive composite according to any one of clauses 1-22, wherein the conductive composite has a density of between about 1 and 30 g/cc.

Clause 24. A conductive composite according to any one of clauses 1-23, wherein the conductiv1, wherein the conductive composite has a density of less than 7 g/cc.

Clause 25. A conductive composite according to any one of clauses 1-24, further comprising an additive that increases thermal oxidative stability.

Clause 26. A conductive composite according to clause 25, wherein the additive is a phosphate, iron oxide, phenolic antioxidant, metal passivator, or combination thereof.

Clause 27. A composition comprising a metal or metal alloy having a melting temperature below 60° C. and a compatibilizing agent.

Clause 28. A composition according to clause 27, wherein the compatibilizing agent comprises a nonionic amphiphilic compound, ionic amphiphilic compound, metallic nanoparticles, or a mixture thereof.

Clause 29. A composition according to clause 27 or clause 28, wherein the composition further comprises an inorganic thickening agent or an organic thickening agent.

Clause 30. A composition according to clause 29, wherein the inorganic thickening agent comprises particles of an inorganic thickening agent which are substantially spherical or have an aspect ratio greater than about 2.

Clause 31. A composition according to clause 30, wherein the particles of an inorganic thickening agent are substantially spherical and have a diameter of from about 0.1-500 μm.

Clause 32. A composition according to clause 29, wherein the inorganic thickening agent comprises particles of an inorganic thickening agent having an aspect ratio greater than about 2 and lengths between about 0.01-10 mm.

Clause 33. A composition according to any one of clauses 27-32, wherein the composition is a paste having a loss modulus (G") greater than a storage modulus (G').

Clause 34. A method for preparing a conductive composite comprising combining a mixture of monomers or a polymer composition with (a) a conductor selected from metals and metal alloys having a melting temperature below about 60° C. and (b) a compatibilizing agent.

Clause 35. A method according to clause 34, further comprising allowing the mixture of monomers to cure to form the conductive composite.

Clause 36. A method for preparing a conductive composite comprising layering a conductive paste onto a surface of a first polymer, wherein the conductive paste comprises (a) a conductor selected from metals and metal alloys having a melting temperature below about 60° C. and; and (b) a compatibilizing agent.

Clause 37. A method according to clause 36, further comprising adding a layer of a second polymer onto the surface of the first polymer having the conductive paste.

Clause 38. A method according to clause 37, wherein the second polymer is the same or different than the first polymer.

Clause 39. A conductive composite comprising:
an elastomer;
a conductor selected from metals and metal alloys having a melting temperature below 60° C.; and
a compatibilizing agent,
wherein the conductive composite has a bulk conductivity of no more than about $5 \times 10^5$ Sim at 20° C., an elongation greater than or equal to 50%, and a tensile strength greater than or equal to 3 MPa.

Clause 40. A substrate carrying a layer of the conductive composite according to any one of clauses 1-26 or 39.

Clause 41. A method for preparing a substrate carrying a layer of a conductive composite, comprising heating the conductive composite of any one of clauses 1-26 or 39 and applying it to a substrate.

What is claimed is:
1. A conductive composite comprising:
(a) a polymer matrix;
(b) a conductor selected from metal alloys having a melting temperature below about 60° C.; and
(c) a compatibilizing agent comprising one or more of fatty alcohol ethoxylates, alkylphenol ethoxylates, ethoxylated amines, fatty acid amides, polyoxyethylene-polyoxypropylene copolymers, alkyl polyglucosides, fatty amine oxides, sulfoxides, or organophosphine oxides, wherein
the metal alloys comprise at least about 50% by weight of gallium, bismuth, mercury, or combinations thereof,
the conductor is stably entrapped within the polymer matrix.

2. A conductive composite according to claim 1, wherein the conductive composite further comprises an ionic amphiphilic compound, metallic nanoparticles, or a mixture thereof.

3. A conductive composite according to claim 2, wherein the metallic nanoparticles have a size less than 100 nm in any linear dimension and comprise copper, nickel, stainless steel, tin, titanium, tungsten, mixtures thereof, and alloys thereof.

4. A conductive composite according to claim 1, wherein the polymer matrix comprises a thermoset or thermoplastic polymer.

5. A conductive composite according to claim 1, further comprising a thickening agent.

6. A conductive composite according to claim 5, wherein the thickening agent is an organic thickening agent.

7. A conductive composite according to claim 5, wherein the thickening agent is an inorganic thickening agent.

8. A conductive composite according to claim 5, wherein the thickening agent comprises rods, wires, substantially spherical particles, or a mixture thereof, and comprises a metal selected from nickel, titanium, tungsten, stainless steel, copper, tin, a metal oxide of nickel, titanium, tungsten, stainless steel, copper, tin, or zinc, ceramics, and combinations thereof,
wherein the substantially spherical particles have an average size of about 0.1-500 μm and the rods and wires have lengths of from 0.01-10 mm.

9. A conductive composite according to claim 1, wherein the conductive composite comprises from about 0.1-50% by volume of the conductor.

10. A conductive composite according to claim 1 which is a laminate.

11. A conductive composite according to claim 10, wherein the conductor and compatibilizing agent are substantially uniformly mixed together and form a layer of the laminate.

12. A conductive composite according to claim 1, wherein the conductor and the compatibilizing agent are substantially uniformly dispersed throughout the polymer matrix.

13. A conductive composite according to claim 1, wherein the conductive composite has a bulk conductivity of no more than about $5 \times 10^5$ S/m at 20° C., an elongation greater than or equal to 50%, and a tensile strength greater than or equal to 3 MPa.

14. A conductive composite according to claim 1, further comprising an additive that increases thermal oxidative stability.

15. A composition consisting of a metal alloy, having a melting temperature below 60° C., optionally at least one inorganic thickening agent or organic thickening agent, and a compatibilizing agent, wherein
the compatibilizing agent consists of one or more of fatty alcohol ethoxylates, alkylphenol ethoxylates, ethoxylated amines, fatty acid amides, polyoxyethylene-polyoxypropylene copolymers, alkyl polyglucosides, fatty amine oxides, sulfoxides, or organophosphine oxides, and
the metal alloy comprises at least about 50% by weight of gallium, bismuth, mercury, or combinations thereof.

16. A composition according to claim 15, wherein the composition further consists of one or more of the inorganic thickening agent or the organic thickening agent.

17. A method for preparing a conductive composite comprising
combining a mixture of monomers or a polymer composition with (a) a conductor selected from metal alloys having a melting temperature below about 60° C. and (b) a compatibilizing agent, wherein
the compatibilizing agent comprises one or more of fatty alcohol ethoxylates, alkylphenol ethoxylates, ethoxylated amines, fatty acid amides, polyoxyethylene-polyoxypropylene copolymers, alkyl polyglucosides, fatty amine oxides, sulfoxides, or organophosphine oxides, and
the metal alloys comprise at least about 50% by weight of gallium, bismuth, mercury, or combinations thereof.

18. A substrate carrying a layer of the conductive composite according to claim 1.

19. A method for preparing a substrate carrying a layer of a conductive composite, comprising heating the conductive composite of claim 1 and applying it to a substrate.

20. A method for preparing a conductive composite comprising layering a conductive paste onto a surface of a polymer, wherein the conductive paste is substantially free of water and consists of
(a) a conductor selected from metals and metal alloys having a melting temperature below about 60° C.;
(b) a compatibilizing agent comprising one or more of fatty alcohol ethoxylates, alkylphenol ethoxylates, ethoxylated amines, fatty acid amides, polyoxyethylene-polyoxypropylene copolymers, alkyl polyglucosides, fatty amine oxides, sulfoxides, or organophosphine oxides; and
(c) an optional thickening agent.

21. A conductive composite comprising a first polymer layer and a continuous paste layer supported by the polymer layer, wherein the continuous paste layer comprises (a) a conductor selected from metal alloys having a melting temperature below about 60° C. and (b) a compatibilizing agent, wherein
the metal alloys comprise at least about 50% by weight of gallium, bismuth, mercury, or combinations thereof.

22. A conductive composite according to claim 21, further comprising a layer of a second polymer covering the continuous paste layer.

23. A conductive composite according to claim 1, wherein the metal alloys comprise about 15-30% by weight of indium, about 55-80% by weight of gallium, and at least one metal selected from tin and zinc.

24. A composition according to claim 15, wherein the metal alloy consists of about 15-30% by weight of indium, about 55-80% by weight of gallium, and at least one metal selected from tin and zinc.

25. A method according to claim 17, wherein the metal alloys comprise about 15-30% by weight of indium, about 55-80% by weight of gallium, and at least one metal selected from tin and zinc.

26. A method according to claim 20, wherein the metal alloys comprise about 15-30% by weight of indium, about 55-80% by weight of gallium, and at least one metal selected from tin and zinc.

27. A conductive composite according to claim 21, wherein the metal alloys comprise about 15-30% by weight of indium, about 55-80% by weight of gallium, and at least one metal selected from tin and zinc.

28. A conductive composite comprising:
(a) two or more layers of a polymer matrix arranged as a laminate;
(b) a conductor selected from metal alloys having a melting temperature below about 60° C. and comprising at least about 50% by weight of gallium, bismuth, mercury, or combinations thereof; and
(c) a compatibilizing agent comprising one or more of fatty alcohol ethoxylates, alkylphenol ethoxylates, ethoxylated amines, fatty acid amides, polyoxyethylene-polyoxypropylene copolymers, alkyl polyglucosides, fatty amine oxides, sulfoxides, or organophosphine oxides,
wherein the conductor and the compatibilizing agent are held as a layer between the layers of the polymer matrix.

29. A conductive composite according to claim 28, wherein the metal alloys comprise about 15-30% by weight of indium, about 55-80% by weight of gallium, and at least one metal selected from tin and zinc.

30. A conductive composite according to claim 28, wherein the composite further comprises an ionic amphiphilic compound, metallic nanoparticles, or a mixture thereof.

31. A conductive composite according to claim 30, wherein the metallic nanoparticles have a size less than 100 nm in any linear dimension and comprise copper, nickel, stainless steel, tin, titanium, tungsten, mixtures thereof, and alloys thereof.

32. A conductive composite according to claim 28, wherein the polymer matrix comprises a thermoset or thermoplastic polymer.

33. A conductive composite according to claim 28, further comprising a thickening agent.

34. A conductive composite according to claim 33, wherein the thickening agent is an organic thickening agent.

35. A conductive composite according to claim 33, wherein the thickening agent is an inorganic thickening agent.

36. A conductive composite according to claim 33, wherein the thickening agent comprises rods, wires, substantially spherical particles, or a mixture thereof, and comprises a metal selected from nickel, titanium, tungsten, stainless steel, copper, tin, a metal oxide of nickel, titanium, tungsten, stainless steel, copper, tin, or zinc, ceramics, and combinations thereof,
    wherein the substantially spherical particles have an average size of about 0.1-500 μm and the rods and wires have lengths of from 0.01-10 mm.

37. A conductive composite according to claim 28, wherein the conductor and compatibilizing agent are substantially uniformly mixed together.

\* \* \* \* \*